US012657075B2

(12) United States Patent
Frolikov

(10) Patent No.: US 12,657,075 B2
(45) Date of Patent: *Jun. 16, 2026

(54) GROUPING REQUESTS TO REDUCE INTER-PROCESS COMMUNICATION IN MEMORY SYSTEMS

(71) Applicant: Micron Technology, Inc., Boise, ID (US)

(72) Inventor: Alex Frolikov, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/741,801

(22) Filed: May 11, 2022

(65) Prior Publication Data

US 2022/0269551 A1     Aug. 25, 2022

Related U.S. Application Data

(63) Continuation of application No. 16/535,665, filed on Aug. 8, 2019, now Pat. No. 11,354,177, which is a continuation of application No. 15/943,230, filed on Apr. 2, 2018, now Pat. No. 10,496,457.

(51) Int. Cl.
*G06F 9/54* (2006.01)
*G06F 13/16* (2006.01)

(52) U.S. Cl.
CPC .............. *G06F 9/546* (2013.01); *G06F 9/544* (2013.01); *G06F 13/1626* (2013.01); *G06F 13/1642* (2013.01); *G06F 13/1663* (2013.01)

(58) Field of Classification Search
CPC ............. G06F 13/1626; G06F 13/1642; G06F 13/1663; G06F 9/546; G06F 9/544

USPC ......................................................... 719/314
See application file for complete search history.

(56) References Cited

U.S. PATENT DOCUMENTS

| | | | |
|---|---|---|---|
| 8,370,609 B1 * | 2/2013 | Favor | G06F 9/3834 |
| | | | 712/225 |
| 10,496,457 B2 | 12/2019 | Frolikov | |
| 11,354,177 B2 | 6/2022 | Frolikov | |
| 2002/0087801 A1 * | 7/2002 | Bogin | G06F 12/0835 |
| | | | 711/144 |
| 2007/0079044 A1 * | 4/2007 | Mandal | G06F 13/404 |
| | | | 710/310 |

(Continued)

OTHER PUBLICATIONS

"Inter-process communication", Wikipedia, printed on Mar. 16, 2018.

(Continued)

*Primary Examiner* — Tuan C Dao
(74) *Attorney, Agent, or Firm* — Greenberg Traurig

(57) ABSTRACT

A memory system having a set of media, a plurality of inter-process communication channels, and a controller configured to run a plurality of processes that communicate with each other using inter-process communication messages transmitted via the plurality of inter-process communication channels, in response to requests from a host system to store data in the media or retrieve data from the media. The memory system has a message manager that examines requests from the host system, identifies a plurality of combinable requests, generates a combined request, and provides the combined request to the plurality of processes as a substitute of the plurality of combinable requests.

11 Claims, 4 Drawing Sheets

(56)           References Cited

U.S. PATENT DOCUMENTS

| | | | |
|---|---|---|---|
| 2009/0292696 | A1 | 11/2009 | Shuster |
| 2010/0250527 | A1 | 9/2010 | Gnanamani et al. |
| 2010/0287187 | A1* | 11/2010 | Wang .................. G06F 16/5854 |
| | | | 707/769 |
| 2010/0332922 | A1* | 12/2010 | Chang ................ G06F 12/0246 |
| | | | 714/763 |
| 2011/0058440 | A1* | 3/2011 | Smith ................ G06F 11/1441 |
| | | | 365/229 |
| 2011/0072209 | A1* | 3/2011 | Lund ......................... G06F 3/00 |
| | | | 711/170 |
| 2011/0113047 | A1 | 5/2011 | Guardalben |
| 2011/0289263 | A1* | 11/2011 | McWilliams ....... G06F 12/0802 |
| | | | 711/E12.008 |
| 2012/0084492 | A1* | 4/2012 | Stenfort ............... G06F 1/3234 |
| | | | 711/170 |
| 2013/0086336 | A1* | 4/2013 | Canepa ................... G06F 3/067 |
| | | | 711/154 |
| 2014/0040212 | A1* | 2/2014 | Yochai ................. G06F 3/0617 |
| | | | 707/E17.001 |
| 2014/0108703 | A1* | 4/2014 | Cohen ................... G06F 3/0634 |
| | | | 711/E12.008 |
| 2014/0215236 | A1 | 7/2014 | Heinrich et al. |
| 2014/0304818 | A1* | 10/2014 | Li ......................... G06F 21/564 |
| | | | 726/24 |
| 2015/0248366 | A1* | 9/2015 | Bergsten ............. G06F 13/4221 |
| | | | 710/308 |
| 2016/0154590 | A1 | 6/2016 | Fan et al. |
| 2016/0337426 | A1 | 11/2016 | Shribman et al. |
| 2017/0109096 | A1* | 4/2017 | Jean ...................... G06F 3/0679 |
| 2017/0132277 | A1* | 5/2017 | Hsiao .................. G06F 16/2425 |
| 2017/0212837 | A1* | 7/2017 | Breternitz ............ G06F 3/0611 |
| 2019/0250850 | A1* | 8/2019 | Benisty ................. G06F 3/0656 |
| 2019/0303223 | A1 | 10/2019 | Frolikov |
| 2019/0370097 | A1 | 12/2019 | Frolikov |

OTHER PUBLICATIONS

Grouping Requests to Reduce Inter-Process Communication in Memory Systems, U.S. Appl. No. 15/943,230, filed Apr. 2, 2018, Inventor: Alex Frolikov, Status: Patented Case, Status Date: Jun. 12, 2019.

Grouping Requests to Reduce Inter-Process Communication in Memory Systems, U.S. Appl. No. 16/535,665, filed Aug. 8, 2019, Inventor: Alex Frolikov, Status: Publications—Issue Fee Payment Verified, Status Date: Oct. 20, 2021.

* cited by examiner

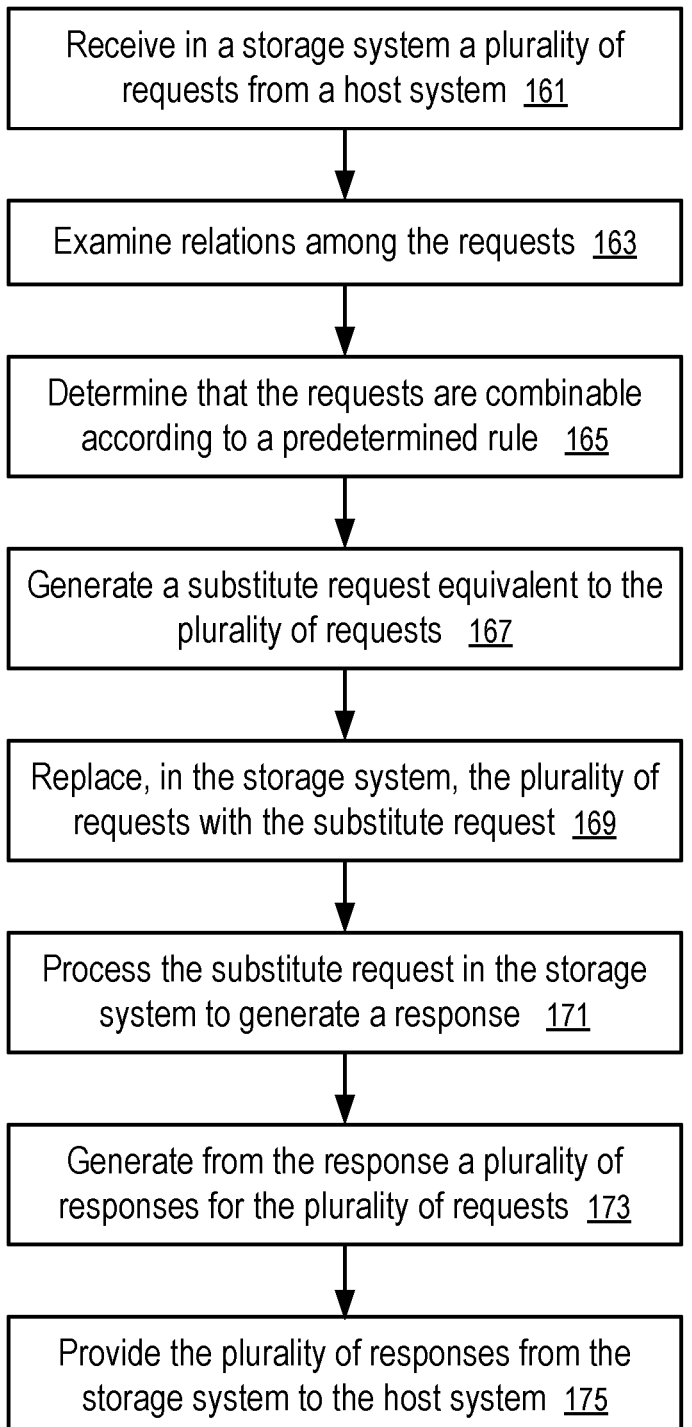

Receive in a storage system a plurality of requests from a host system  161

Examine relations among the requests  163

Determine that the requests are combinable according to a predetermined rule  165

Generate a substitute request equivalent to the plurality of requests  167

Replace, in the storage system, the plurality of requests with the substitute request  169

Process the substitute request in the storage system to generate a response  171

Generate from the response a plurality of responses for the plurality of requests  173

Provide the plurality of responses from the storage system to the host system  175

FIG. 4

GROUPING REQUESTS TO REDUCE INTER-PROCESS COMMUNICATION IN MEMORY SYSTEMS

RELATED APPLICATIONS

The present application is a continuation application of U.S. patent application Ser. No. 16/535,665, filed Aug. 8, 2019 and issued as U.S. Pat. No. 11,354,177 on Jun. 7, 2022, which is a continuation application of U.S. patent application Ser. No. 15/943,230, filed Apr. 2, 2018, issued as U.S. Pat. No. 10,496,457 on Dec. 3, 2019, and entitled "Grouping Requests to Reduce Inter-Process Communication in Memory Systems," the entire disclosures of which applications are hereby incorporated herein by reference.

FIELD OF THE TECHNOLOGY

At least some embodiments disclosed herein relate to memory systems in general, and more particularly, but not limited to reduction of inter-process communication via grouping of requests.

BACKGROUND

A memory system can be a storage system, such as a solid-state drive (SSD), and can include one or more memory components that store data. For example, a memory system can include memory devices such as non-volatile memory devices and volatile memory devices. In general, a host system can utilize a memory system to store data at the memory devices of the memory system and to retrieve data stored at the memory system.

The memory system can have a plurality of running processes that are executed in one or more processors. Different running processes can be configured to process different types of tasks; and a request from the host system can be processed by the memory system using more than one of the running processes to complete a series of tasks before a response is generated and provided from the memory system to the host system.

Inter-Process Communication (IPC) provides a mechanism for running processes to communicate with each other in performing such a series of tasks.

BRIEF DESCRIPTION OF THE DRAWINGS

The embodiments are illustrated by way of example and not limitation in the figures of the accompanying drawings in which like references indicate similar elements.

FIG. 4 shows a method to generate responses based on grouping requests.

DETAILED DESCRIPTION

Figure 1:
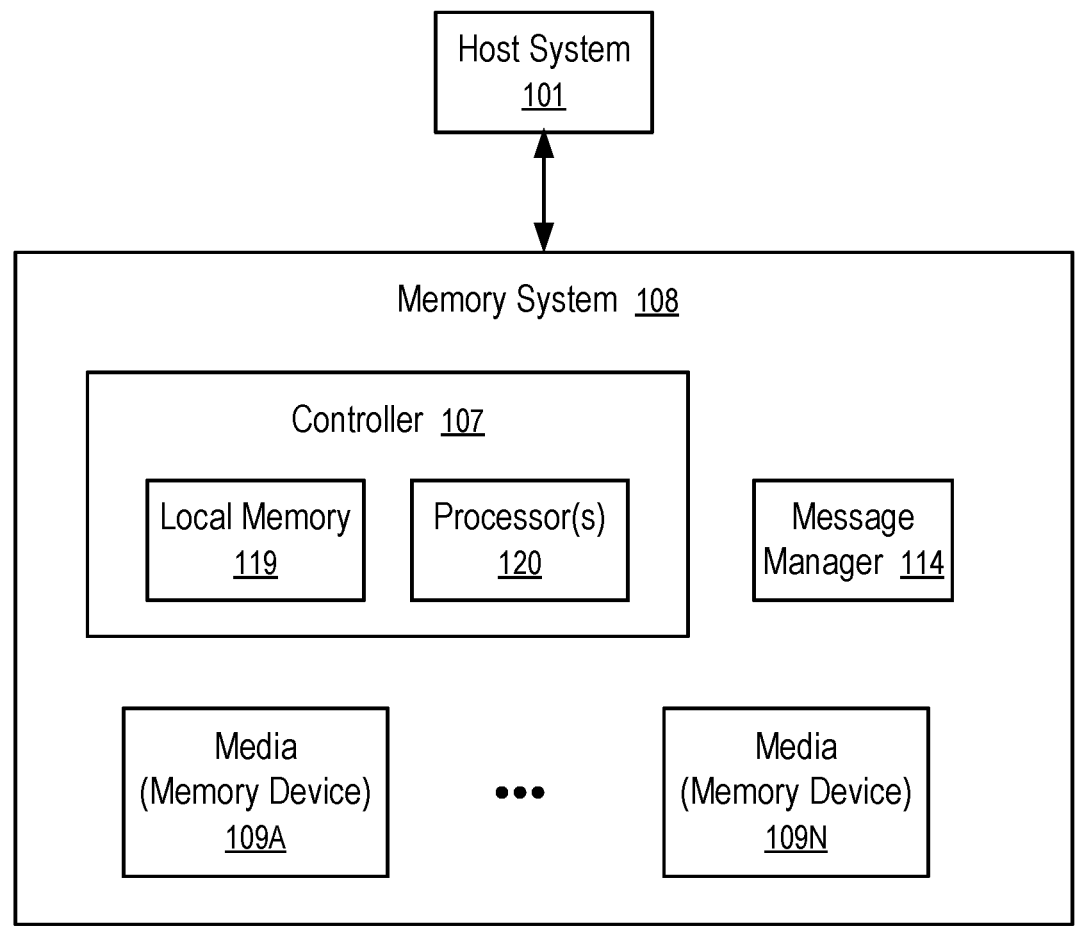
FIG. 1 shows a computing system having a memory system having a message manager configured to group requests to reduce inter-process communication in accordance with some embodiments of the present disclosure.

At least some aspects of the present disclosure are directed to combining similar requests from a host system for processing as a combined request within a memory system with reduced inter-processing communication in the memory system. An example of a memory system is a storage system, such as a solid-state drive (SSD). In some embodiments, the memory system is a hybrid memory/storage system. In general, a host system can utilize a memory system that includes one or more memory devices. The memory devices can include non-volatile memory devices, such as, for example, memory units formed based on negative-and (NAND) logic gates, memory units formed based on negative-or (NOR) logic gates, etc. The host system can provide write requests to store data at the memory devices of the memory system and can provide read requests to retrieve data stored at the memory system. A memory system can include a controller that manages the memory devices to perform operations such as reading data, writing data, or erasing data and other such operations. A storage system is used as one example of the memory system in the present disclosure.

A memory system can have multiple processing cores, or processes, running substantially independent from each other to perform same and/or different types of tasks. Inter-process communication (IPC) messages can be transmitted among the processing cores, or processes, to facilitate the collaboration among the processing cores, or processes, in performing a sequence of tasks, in response to a request from a host system, in processing the request and generating a response to the request. For example, to process a request from a host system to retrieve data from a storage media, the memory system can use the running processes to perform a sequence of tasks such as translating a logical address into a physical address, retrieving the data from the storage media using the physical address, generating a response using the retrieved data.

Within the memory system there can be limited resources for parallel transmission of inter-process communication (IPC) messages from one process to another. In some instances, the performance bottleneck of the memory system can be in the transmission of the inter-process communication (IPC) messages among the processing cores or running processes. Since the inter-process communication (IPC) messages are typically driven by requests from the host system, grouping similar requests from the host system into a combined request can reduce the inter-process communication (IPC) messages and improve the performance level of the memory system.

For example, a host system uses a predetermined protocol to request data operations. Each of the data operations is for the data storage or retrieval of an amount of data. The amount can be limited by a predetermined size (e.g., 4 KB). For example, the predetermined size may be limited by the predetermined protocol (e.g., Non-Volatile Memory Host Controller Interface Specification (NVMHCIS) or NVM Express (NVMe)). The memory system can examine a series of requests from the host system to determine whether the requests can be combined into a request for a larger amount of combined data that exceeds the predetermined size (e.g., 4 KB). Processing the combined request in the memory system uses less inter-process communication (IPC) messages than processing the series of requests separately. Thus, the performance level of the memory system can be improved by combining the series of requests into the combined request for processing in the memory system.

FIG. 1 shows a computing system having a memory system (108) having a message manager (114) configured to group requests to reduce inter-process communication in accordance with some embodiments of the present disclosure.

For example, when the memory system (108) receives a set of requests from a host system (101), the message manager (114) determines whether the requests can be combined as a combined request according to a set of predetermined rules. If so, the message manager (114) generates the combined request for processing by a controller (107) of the memory system (108). The combined request drives inter-process communication in processes running in the controller (107) and thus reduces the inter-process communication messages in comparison with driving similar processing operations using the multiple requests. In some instances, when the controller (107) generates a response to the combined request, the message manager (114) generates separate responses that are responsive to the original set of requests received from the host system (101).

In general, the memory system (108) can include media, such as memory devices (109A to 109N). The memory devices (109A to 109N) can be volatile memory devices, non-volatile memory (NVM) devices, or a combination of such. In some embodiments, the memory system (108) is a storage system. An example of a storage system is a solid state drive (SSD). In some embodiments, the memory system (108) is a hybrid memory/storage system. In general, the computing system can include a host system (101) that uses the memory system (108). In some implementations, the host system (101) can write data to the memory system (108) and read data from the memory system (108).

The host system (101) can be a computing device such as a desktop computer, laptop computer, network server, mobile device, or such computing device that includes a memory and a processing device. The host system (101) can include or be coupled to the memory system (108) so that the host system (101) can read data from or write data to the memory system (108). The host system (101) can be coupled to the memory system (108) via a physical host interface. As used herein, "coupled to" generally refers to a connection between components, which can be an indirect communicative connection or direct communicative connection (e.g., without intervening components), whether wired or wireless, including connections such as, electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Small Computer System Interface (SCSI), Serial Attached SCSI (SAS), etc. The physical host interface can be used to transmit data between the host system (101) and the memory system (108). The host system (101) can further utilize an NVM Express (NVMe) interface to access the memory devices (109A to 109N) when the memory system (108) is coupled with the host system (101) by the PCIe interface. The physical host interface can provide an interface for passing control, address, data, and other signals between the memory system (108) and the host system (101).

The memory devices (109A to 109N) can include any combination of the different types of non-volatile memory devices and/or volatile memory devices. An example of non-volatile memory devices includes a negative-and (NAND) type flash memory. Each of the memory devices (109A to 109N) can include one or more arrays of memory cells such as single level cells (SLCs), multi-level cells (MLCs), triple level cells (TLCs), quad-level cells (QLCs), etc. In some implementations, a particular memory device can include both an SLC portion and a MLC (or TLC or QLC) portion of memory cells. Each of the memory cells can store one or more bits of data used by the host system (101). Although non-volatile memory devices such as NAND type flash memory are described, the memory devices (109A to 109N) can be based on any other type of memory such as a volatile memory. In some implementations, the memory devices (109A to 109N) can be, but are not limited to, random access memory (RAM), read-only memory (ROM), dynamic random access memory (DRAM), static random access memory (SRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many Flash-based memory, cross point non-volatile memory can perform a write in-place operation, where a non-volatile memory cell can be programmed without the non-volatile memory cell being previously erased. Furthermore, the memory cells of the memory devices (109A to 109N) can be grouped as memory pages or data blocks that can refer to a unit of the memory device used to store data.

The controller (107) can communicate with the memory devices (109A to 109N) to perform operations such as reading data, writing data, or erasing data at the memory devices (109A to 109N) and other such operations. The controller (107) can include hardware such as one or more integrated circuits and/or discrete components, a buffer memory, or a combination thereof. The controller (107) can be a microcontroller, special purpose logic circuitry (e.g., a field programmable gate array (FPGA), an application specific integrated circuit (ASIC), etc.), or another suitable processor. The controller (107) can include one or more processors (processing devices) (120) configured to execute instructions stored in local memory (119).

In the illustrated example, the local memory (119) of the controller (107) includes an embedded memory configured to store instructions for performing various processes, operations, logic flows, and routines that control operation of the memory system (108), including handling communications between the memory system (108) and the host system (101), and the functions of the message manager (114), which is described in greater detail below. In some embodiments, the local memory (119) can include memory for the implementation of the message manager (114) and/or memory registers storing, e.g., memory pointers, fetched data, etc. The local memory (119) can include read-only memory (ROM) for storing micro-code.

While the example memory system (108) in FIG. 1 has been illustrated as including the controller (107), in another embodiment of the present disclosure, a memory system (108) may not include a controller (107), and may instead rely upon external control (e.g., provided by an external host, or by a processor or controller separate from the memory system).

In general, the controller (107) can receive commands or operations from the host system (101) and can convert the commands or operations into instructions or appropriate commands to achieve the desired access to the memory devices (109A to 109N). The controller (107) can be responsible for other operations such as wear leveling operations, garbage collection operations, error detection and error-correcting code (ECC) operations, encryption operations, caching operations, and address translations between a logical block address and a physical block address that are associated with the memory devices (109A to 109N). The controller (107) can further include host interface circuitry to communicate with the host system (101) via the physical host interface. The host interface circuitry can convert the commands received from the host system into command instructions to access the memory devices (109A to 109N) as well as convert responses associated with the memory devices (109A to 109N) into information for the host system (101).

The memory system (108) can also include additional circuitry or components that are not illustrated. In some implementations, the memory system (108) can include a cache or buffer (e.g., DRAM) and address circuitry (e.g., a row decoder and a column decoder) that can receive an address from the controller (107) and decode the address to access the memory devices (109A to 109N).

In one example, the host system (101) has one or more connectors to provide the memory system (108) with power and/or communicate with the memory system (108) via a communication channel and a predetermined protocol; and the memory system (108) has one or more connectors to receive the power, data and commands from the host system (101). For example, the connection between connector on the host system (101) and connector on memory system (108) may utilize a PCIe bus or a SATA bus.

Figure 2:
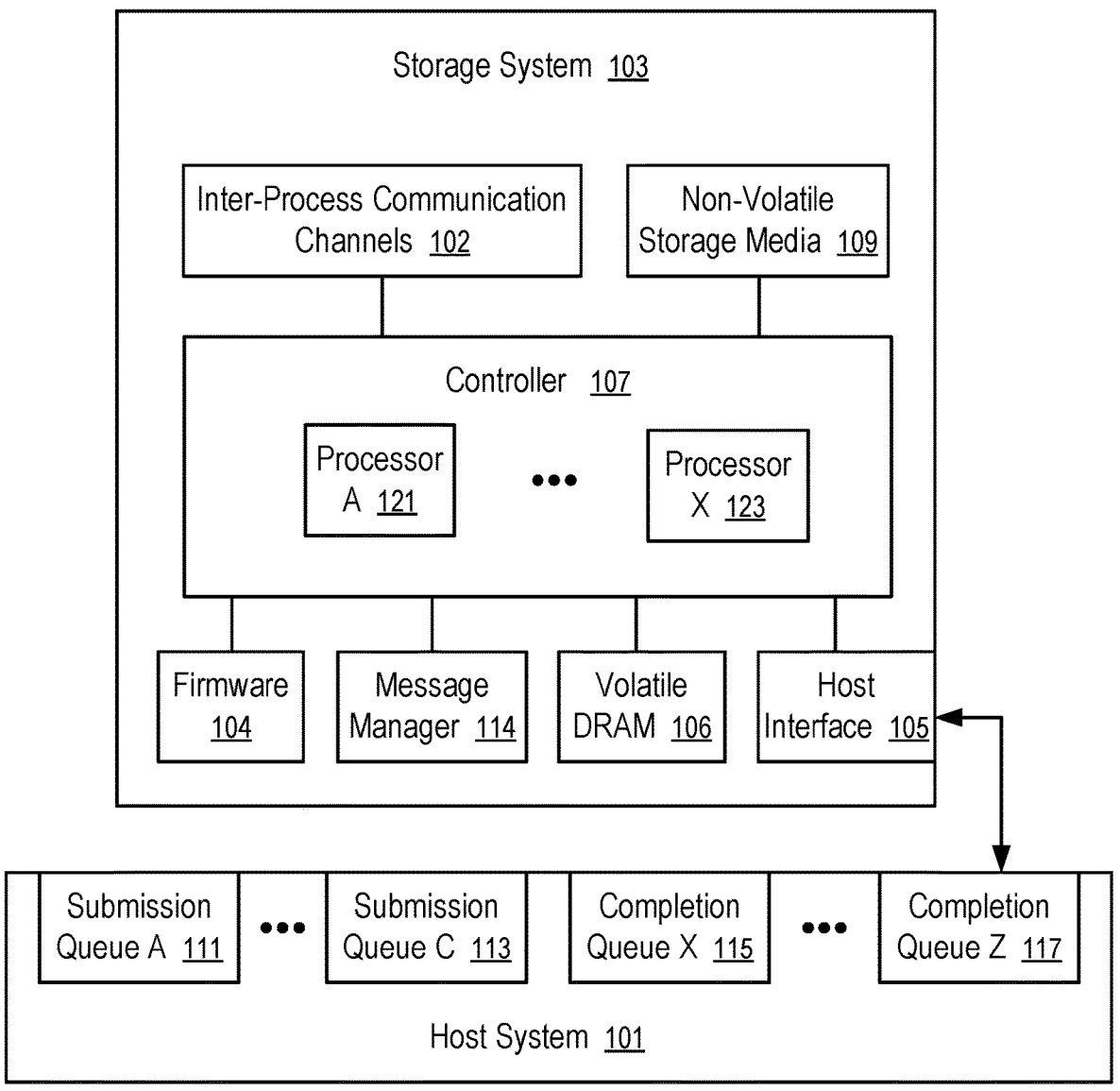
FIG. 2 shows a storage system configured to group requests to reduce inter-process communication.

FIG. 2 shows a storage system (103) configured to group requests to reduce inter-process communication. For example, the storage system (103) of FIG. 2 can be used as an example of the memory system (108) in the computing system of FIG. 1.

The storage system (103) of FIG. 2 has a set of inter-process communication channels (102) that facilitate the parallel transmission of inter-process communication messages among running processes in the controller (107). The inter-process communication channels (102) can be implemented via registers, shared memory, pipes, message queues, etc.

For example, the storage system (103) has a controller (107) with a plurality of processors (121, ..., 123). Each of the processors (121, ..., 123) can be configured to run a process that perform a predetermined task. Some of the processors (121, ..., 123) may perform a same task; and at least some of the processes running in the controller (107) perform different tasks. In some instances, a processor (121, ..., or 123) may run one process to perform a task in a period of time and then run another process to perform another task in another period of time.

During the processing of a data access request by the controller (107) an inter-process communication can be transmitted from one of the running processes to another to indicate the completion of the performance of one of the tasks to be performed for the data access request, and/or to request the start of the performance of another one of the tasks.

When similar data access requests that need to be processed by the same set of tasks in the same sequence, each of the data access requests causes a similar set of inter-process communication messages; and the multiple data access requests cause multiple sets of messages being transmitted using the inter-process communication channels (102).

To reduce the number of inter-process communication messages, the message manager (114) combines the similar data access requests as a single request which drives only one set of inter-process communication messages, instead of multiple sets of similar inter-process communication messages driven by multiple similar data access requests.

For example, the storage system (103) has a host interface (105) to retrieve data access requests from the host system (101). The storage system (103) and the host system (101) communicate with each other via message queues.

For example, a submission queue (e.g., 111, ..., or 113) can be used by the host system (101) to submit requests to the storage system (103); and a completion queue (e.g., 115, ..., or 117) can be used by the host system (101) to receive responses from the storage system (103).

For example, a version of NVMe (e.g., Non-Volatile Memory Host Controller Interface Specification 1.2) specifies the use of a circular buffer with a fixed slot size for a submission queue (e.g., 111, ..., or 113) or a completion queue (e.g., 115, ..., or 117).

The NVMe further specifies different types of message queues for the processing of different types of commands. For example, input/output (I/O) commands are limited to be submitted via I/O submission queues; and admin commands are limited to be submitted via admin submission queues. Examples of I/O commands include commands to read data from the storage system (103), commands to write data into the storage system (103), commands to compare data in the storage system (103), etc. Examples of admin commands include commands to manage namespaces, commands to attach namespaces, commands to create I/O submission or completion queues, commands to delete I/O submission or completion queues, commands for firmware management, etc. The NVMe allows multiple I/O submission queues to share an I/O completion queue by explicitly identifying the I/O completion queue in the request for the creation of each of the I/O submission queues.

The NVMe requires that the storage system (103) fetch the commands/requests from a submission queue (111, ..., or 113) according to the order in which the commands are placed in the submission queue (111, ..., or 113). However, the NVMe allows the controller (107) to execute the fetched commands in any order.

In general, the host system (101) places requests in submission queues (111, ..., 113) according to a predetermined protocol. The host interface (105) retrieves the requests from the submission queues (111, ..., 113) according to the predetermined protocol for processing by the controller (107). The responses to the requests are placed by the host interface (105) according to the predetermined protocol in the completion queues (115, ..., 117). The predetermined protocol may limit the size of a data chunk that is being addressed in a command/request for operation by the storage system (103) (e.g., for storing the data in the address specified in the command/request, or for retrieving the data from the address specified in the command/request). Thus, when the host system (101) has a need to operation upon a large data chunk that is bigger than the size limit, the host system (101) breaks down the large data chunk into multiple small data chunks according to the size limit and generates multiple similar requests for operations on the multiple data chunks.

When the multiple similar requests are received in the storage system (103) according to the size limit of the predetermined protocol, the message manager (114) combines the addressed multiple data chunks into an alternatively addressed large data chunk and thus combines the multiple requests into an alternative combined request that operates on the large data chunk. By processing the combined request, instead of the multiple requests separately, the controller (107) reduces the number of inter-process communication messages that need to be transmitted via the inter-process communication channels (102), reduces communication traffic congestion at the inter-process communication channels (102), and reduces or eliminates performance impact caused by the communication traffic congestion.

In general, the message manager (114) can combine a subset of the multiple data chunks that are generated from the initial large data chunk to generate a data chunk that is smaller than the initial large data chunk that is broken down by the host system (101) into the multiple data chunks for compliance with the communication protocol between the storage system (103) and the host system (101). The combined data chunk can be limited by an alternative size limit that is larger than the size limit of the predetermined protocol for communications between the storage system (103) and the host system (101). In some instances, a combined data chunk may not correspond to a portion of an initial large data chunk that is broken done by the host system (101) to generate the multiple data chunks.

Figure 3:
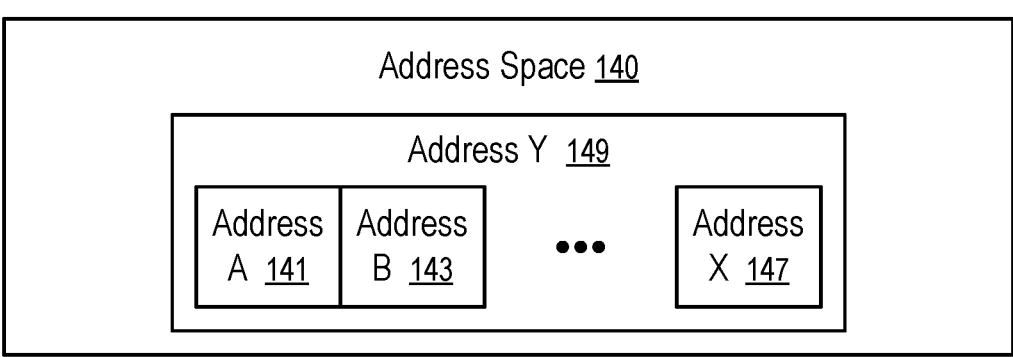
FIG. 3 illustrates an example of grouping similar requests based on addresses.
Figure 3:
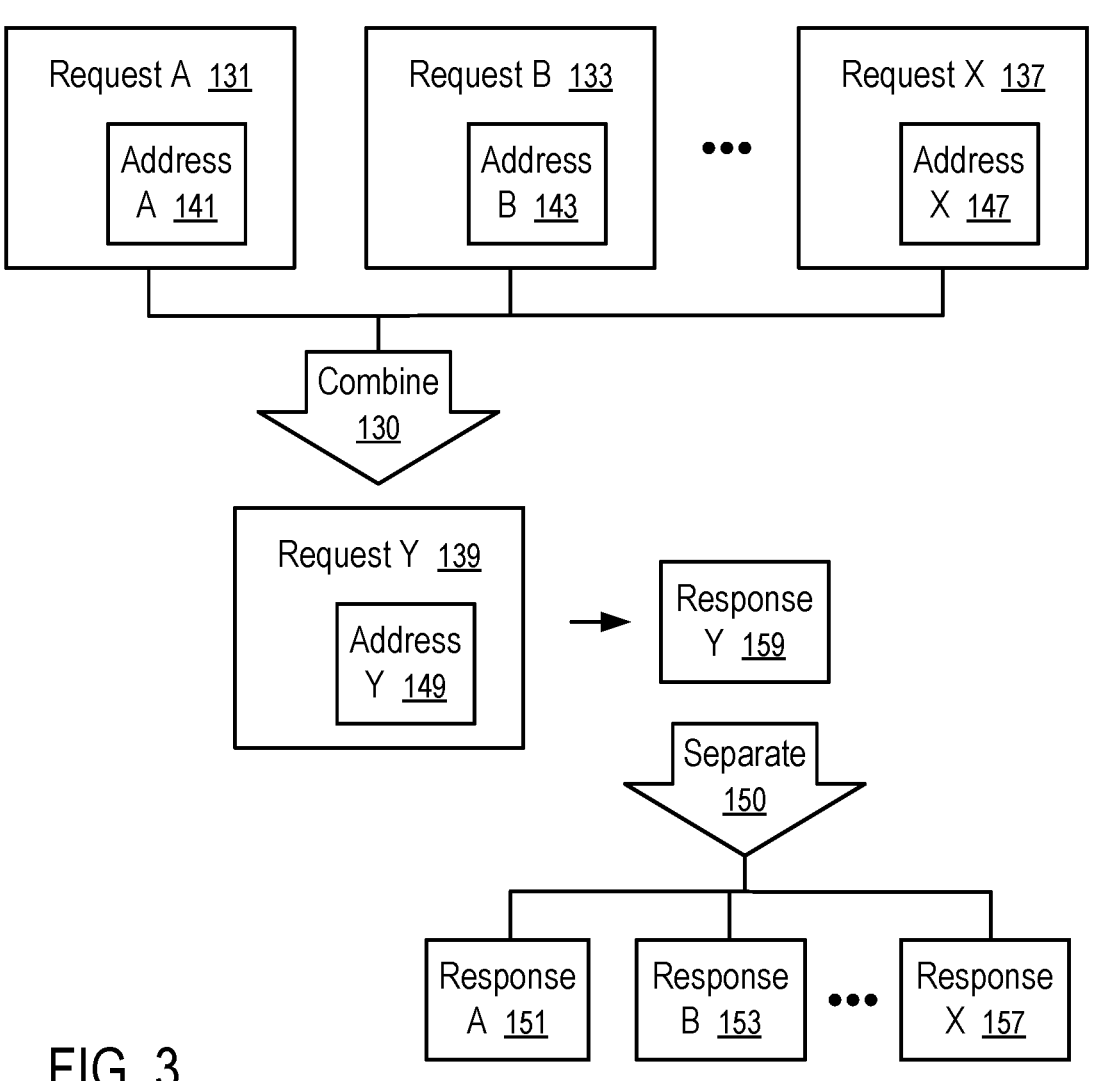

FIG. 3 illustrates an example of grouping similar requests based on addresses. For example, the technique of FIG. 3 can be implemented in the message manager (114) of FIG. 1 and/or FIG. 2.

In FIG. 3, requests (131, 133, . . . , 137) require the same type of operations but on data identified using different addresses (141, 143, . . . , 147). In an address space (140) the addresses (141, 143, . . . , 147) as a whole can be identified as an address (149) that identifies the same set of memory units identified by the addresses (141, 143, . . . , 147). Thus, the requests (131, 133, . . . , 137) can be combined (130) as a combined request (139) that requests the same type of operations of the requests (131, 133, . . . , 137) on data/memory units identified using the address (149) or, equivalent, the addresses (141, 143, . . . , 147).

In one example, the request (131) directs the storage system (103) to retrieve data from media (e.g., 109, or 109A to 109N) according to the address (141); the request (131) directs the storage system (103) to retrieve data from media (e.g., 109, or 109A to 109N) according to the address (143); and the request (137) directs the storage system (103) to retrieve data from media (e.g., 109, or 109A to 109N) according to the address (147). The combined request (139) directs the storage system (103) to retrieve data from media (e.g., 109, or 109A to 109N) according to the address (149).

In another example, the request (131) directs the storage system (103) to store data in media (e.g., 109, or 109A to 109N) according to the address (141); the request (131) directs the storage system (103) to store data in media (e.g., 109, or 109A to 109N) according to the address (143); and the request (137) directs the storage system (103) to store data in media (e.g., 109, or 109A to 109N) according to the address (147). The combined request (139) directs the storage system (103) to store the corresponding data in media (e.g., 109, or 109A to 109N) according to the address (149).

In some instances, each of the addresses (141, 143, . . . , 147) identifying a set of memory units of a predetermined size (e.g., 4 KB) in a logical memory address space (140). The storage system (103) maps the logical addresses (141, 143, . . . , 147) into physical addresses of non-volatile storage media (109) of the storage system (103) to perform the data read or write operations.

In some instances, the addresses (141, 143, . . . , 147) are recognized as being contiguous in the logical memory address space (140); and as a result, the requests (131, 133, . . . , 137) are combined to operate on the address (149). In general, when the addresses (141, 143, . . . , 147) are contiguous in the logical memory address space (140), the corresponding physical addresses may not be contiguous in a physical memory address space.

In some instances, the combination (130) is to generate an address (149) that has a predetermined size (e.g., for simplicity). Thus, a predetermined number x of addresses (141, 143, . . . , 147) of a smaller predetermined size (e.g., 4 KB) can be combined to generate the combined address of a larger predetermined size (e.g., x times of 4 KB).

Alternatively, the combined address (149) can be identified using a format for an address of a variable length. For example, each of the addresses (141, 143, . . . , 147) represents a predetermined size of physical memory (e.g., 4 KB); and the block of the addresses (141, 143, . . . , 147) corresponding to the combined address (149) can be represented by an address range, such as a combination of the leading address (141) and a count of the addresses (141, 143, . . . , 147) in the block. In some instances, a list of the addresses (141, 143, . . . , 147) can be used as the address (149), which allows the combination of requests (131, 133, . . . , 137) operating on addresses (141, 143, . . . , 147) that may not be contiguous even in the logical memory address space (140).

In some instances, the addresses (141, 143, . . . , 147) used in the original requests (131, 133, . . . , 137) may identify physical memory units of variable sizes.

In general, memory units to be operated upon in accordance with the requests (131, 133, . . . , 137) may not have contiguous logical addresses in the logical memory address space (140) and/or have the same size. The address (149) can be implemented as an address list, such as a list of the addresses (141, 143, . . . , 147).

After the storage system (103) generates a response (159) for the combined request (139), the message manager (114) separates (150) the response (159) to generate the responses (151, 153, . . . , 157) for the original requests (131, 133, . . . , 137) respectively.

In some instances, the message manager (114) groups the requests from the host system (101) for processing by the controller (107). In other instances, the message manager (114) groups the similar requests from one processing core to one or more other processing cores for the same type of operations at different addresses.

FIG. 4 shows a method to generate responses based on grouping requests. For example, the method of FIG. 4 can be used in the memory system (108) of FIG. 1 in general and in the storage system (103) of FIG. 2 as an example, to implement the technique of FIG. 3.

The method of FIG. 4 includes: receiving (161) in a storage system (103) a plurality of requests (131, 133, . . . , 137) from a host system (101); examining (163) relations among the requests (131, 133, . . . , 137); determining (165) that the requests (131, 133, . . . , 137) are combinable according to a predetermined rule; generating (167) a substitute request (139) equivalent to the plurality of requests (131, 133, . . . , 137); replacing (169), in the storage system (103), the plurality of requests (131, 133, . . . , 137) with the substitute request (139); processing (171) the substitute request (139) in the storage system (103) to generate a response (159); generating (173) from the response (159) a plurality of responses (151, 153, . . . , 157) for the plurality of requests (131, 133, . . . , 137); and providing (175) the plurality of responses (151, 153, . . . , 157) from the storage system (103) to the host system (101).

For example, a memory system (108) has a set of media (109A to 109N, or 109), a plurality of inter-process communication channels (102); and a controller (107) that is configured to run a plurality of processes that, in response to requests from a host system (101) to store data in the media or retrieve data from the media, communicate with each other using inter-process communication messages transmitted via the plurality of inter-process communication channels (102). The memory system has a message manager (114), implemented via firmware (104) executed by the controller (107) and/or special purpose hardware, that examines requests from the host system (101), identifies a plurality of combinable requests (131, 133, . . . , 137), generates a combined request (139), and provides the combined request (139) to the plurality of processes for processing as a substitute of the plurality of separate requests (131, 133, . . . , 137).

For example, the set of media includes a flash memory; and the memory system is a solid state drive in one embodiment.

For example, after the plurality of processes generates a response (159) to the combined request (149), the message manager (114) further generates, from the response (159) responsive to the combined request (130), a plurality of responses (151, 153, . . . , 157) for the plurality of combinable requests (131, 133, . . . , 137) respectively.

For example, the memory system (108) receives from the host system (101) the plurality of combinable requests (131, 133, . . . , 137) in accordance in accordance with a predetermined protocol (e.g., NVMe); the plurality of responses (151, 153, . . . , 157) are communicated from the memory system (108) to the host system (101) in accordance with the predetermined protocol; and the predetermined protocol limits data items to be addressed by each request (e.g., 151, 153, . . . , 157) to a predetermined size limit (e.g., 4 KB).

For example, the plurality of combinable requests (131, 133, . . . , 137) are identified as being combinable based on commonly requesting a same set of operations to be operated upon different portions of the media (109A to 109N, or 109) addressed using different addresses (141, 143, . . . , 147) specified in the respective requests (131, 133, . . . , 137).

The addresses (141, 143, . . . , 147) specified in the plurality of combinable requests (131, 133, . . . , 137) may be required to be contiguous in a logical memory address space (140); and the combined request (139) identifies the different addresses (141, 143, . . . , 147) using an address range (149).

Alternatively, the addresses (141, 143, . . . , 147) specified in the plurality of combinable requests (131, 133, . . . , 137) are not required to be contiguous in a logical memory address space (140); and the combined request (139) identifies the different addresses (141, 143, . . . , 147) using an address list (149).

The storage system (103) of FIG. 2 can be attached to the host system (101) in FIG. 1 as an implementation of the memory system (108). A communication channel between the host system (101) and the memory system (108) in general and the storage system (103) in particular allows the host system (101) to send data requests and/or other commands that trigger certain operations of the controller (107) on the media (e.g., 109A to 109N, 109), such as data write operations, data read operations, data erasure operations. A host interface (105) implements the communication protocols of the communication channel.

In some implementations, the communication channel between the host system (101) and the memory system (108) or the storage system (103) includes a bus for computer peripheral devices, such as a PCIe bus, a SATA bus, a USB bus.

In some implementations, the communication channel between the host system (101) and the storage system (103) includes a computer network, such as a local area network, a wireless local area network, a wireless personal area network, a cellular communications network, a broadband high-speed always-connected wireless communication connection (e.g., a current or future generation of mobile network link); and the host system (101) and the storage system (103) can be configured to communicate with each other using data storage management and usage commands similar to those in NVMe protocol.

The controller (107) of the storage system (103) can run firmware (104) to perform operations responsive to the communications from the host system (101). Firmware in general is a type of computer program that provides control, monitoring and data manipulation of engineered computing devices.

The storage system (103) can have non-volatile storage media (109). Examples of non-volatile storage media (109) include memory cells formed in an integrated circuit and magnetic material coated on rigid disks. Non-volatile storage media (109) can maintain the data/information stored therein without consuming power. Memory cells can be implemented using various memory/storage technologies, such as NAND logic gate, NOR logic gate, phase-change memory (PCM), magnetic memory (MRAM), resistive random-access memory, cross point storage and memory devices (e.g., 3D XPoint memory). A cross point memory device uses transistor-less memory elements, each of which has a memory cell and a selector that are stacked together as a column. Memory element columns are connected via two perpendicular layers of wires, where one layer is above the memory element columns and the other layer below the memory element columns. Each memory element can be individually selected at a cross point of one wire on each of the two layers. Cross point memory devices are fast and non-volatile and can be used as a unified memory pool for processing and storage.

In some instances, the controller (107) has in-processor cache memory with data access performance that is better than the volatile DRAM (106) and/or the non-volatile storage media (109). Thus, it is preferred to cache parts of instructions and data used in the current computing task in the in-processor cache memory of the controller (107) during the computing operations of the controller (107). In some instances, the controller (107) has multiple processors (121, . . . , 123), each having its own in-processor cache memory.

Optionally, the controller (107) performs data intensive, in-memory processing using data and/or instructions organized in the storage system (103). For example, in response to a request from a host system (101), the controller (107) performs a real time analysis of a set of data stored in the storage system (103) and communicates a reduced data set to the host system (101) as a response. For example, in some applications, the storage system (103) is connected to real time sensors to store sensor inputs; and the processors (120, 121, . . . , 123) of the controller (107) are configured to perform machine learning and/or pattern recognition based on the sensor inputs to support an artificial intelligence (AI) system that is implemented at least in part via the storage system (103) and/or the host system (101).

In some implementations, the processors (120, 121, . . . , 123) of the controller (107) are integrated with memory (e.g., 119, 109A, . . . , 109N, 106, 109) in computer chip fabrication to enable processing in memory and thus overcome the von Neumann bottleneck that limits computing performance as a result of a limit in throughput caused by latency in data moves between a processor and memory configured separately according to the von Neumann architecture. The integration of processing and memory increases processing speed and memory transfer rate and decreases latency and power usage.

The storage system (103) can be used in various computing systems, such as a cloud computing system, an edge computing system, a fog computing system, and/or a stand-alone computer. In a cloud computing system, remote computer servers are connected in a network to store, manage, and process data. An edge computing system optimizes cloud computing by performing data processing at the edge of the computer network that is close to the data source and thus reduces data communications with a centralize server and/or data storage. A fog computing system uses one or more end-user devices or near-user edge devices to store data and thus reduces or eliminates the need to store the data in a centralized data warehouse.

Some embodiments involving the operation of the controller (107) can be implemented using computer instructions executed by the controller (107), such as the firmware (104) of the controller (107). In some instances, hardware circuits can be used to implement at least some of the functions. The firmware (104) can be initially stored in the non-volatile storage media (109), or another non-volatile device, and loaded into the volatile DRAM (106) and/or the in-processor cache memory for execution by the controller (107).

A non-transitory computer storage medium can be used to store instructions of the firmware (104) of the memory system (108) in general and the storage system (103) in particular. When the instructions are executed by the controller (107) of the memory system (108) or the storage system (103), the instructions cause the controller (107) to perform a method discussed above.

In this description, various functions and operations may be described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor or micro-controller, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

A tangible, non-transitory computer storage medium can be used to store software and data which, when executed by a data processing system, causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer-to-peer networks. Different portions of the data and instructions can be obtained from different centralized servers and/or peer-to-peer networks at different times and in different communication sessions or in a same communication session. The data and instructions can be obtained in their entirety prior to the execution of the applications. Alternatively, portions of the data and instructions can be obtained dynamically, just in time, when needed for execution. Thus, it is not required that the data and instructions be on a machine-readable medium in their entirety at a particular instance of time.

Examples of computer-readable storage media include, but are not limited to, recordable and non-recordable type media such as volatile and non-volatile memory devices, read only memory (ROM), random access memory (RAM), flash memory devices, floppy and other removable disks, magnetic disk storage media, and optical storage media (e.g., Compact Disk Read-Only Memory (CD ROM), Digital Versatile Disks (DVDs), etc.), among others. The instructions may be embodied in a transitory medium, such as electrical, optical, acoustical or other forms of propagated signals, such as carrier waves, infrared signals, digital signals, etc. A transitory medium is typically used to transmit instructions, but not viewed as capable of storing the instructions.

In various embodiments, hardwired circuitry may be used in combination with software instructions to implement the techniques. Thus, the techniques are neither limited to any specific combination of hardware circuitry and software, nor to any particular source for the instructions executed by the data processing system.

Although some of the drawings illustrate a number of operations in a particular order, operations that are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A memory system, comprising:
a solid-state drive, including:
    a host interface configured to receive, from a host system, requests to store data into the memory system and to retrieve data from the memory system;
    a set of media; and
    a controller configured to run a plurality of processes that communicate with each other using inter-process communication messages transmitted via a plurality of inter-process communication channels;
wherein the controller is configured to examine the requests from the host system, generate a combined request, and provide the combined request to the plurality of processes as a substitute of a plurality of combinable requests in accessing the media;
wherein the plurality of combinable requests are identified based on requesting a common set of operations to be operated upon different portions of the media addressed using different non contiguous addresses in a logical memory address space; and
wherein the plurality of processes are operatable to generate a response to the combined request.

2. The memory system of claim 1, wherein the set of media includes a flash memory.

3. The memory system of claim 2, wherein the memory system is a solid-state drive.

4. The memory system of claim 1, wherein the memory system receives from the host system the plurality of combinable requests in accordance with a predetermined protocol; a plurality of responses are communicated from the memory system to the host system in accordance with the predetermined protocol; and the predetermined protocol limits data items to be addressed by each request to a predetermined size limit.

5. A method, comprising:
running a plurality of processes in a controller in a solid-state drive of a memory system, wherein the processes communicate with each other using inter-process communication messages transmitted via a plurality of inter-process communication channels, in response to requests from a host system to store or retrieve data in a set of media;
identifying, by the solid-state drive of the memory system from the requests, a plurality of combinable requests, wherein the plurality of combinable requests are identified based on requesting a common set of operations to be operated upon different portions of the media addressed using non contiguous addresses in a logical memory address space;
generating, in the solid-state drive, a combined request;
providing the combined request to the plurality of processes as a substitute of the plurality of combinable requests; and
generating by the plurality of processes a response to the combined request.

6. The method of claim 5, wherein the set of media includes a flash memory; and the memory system is a solid-state drive.

7. The method of claim 5, wherein the memory system receives from the host system the plurality of combinable requests in accordance with a predetermined protocol; a plurality of responses are communicated from the memory system to the host system in accordance with the predetermined protocol; and the predetermined protocol limits data items to be addressed by each request to a predetermined size limit.

8. The method of claim 5, wherein the combined request identifies the different addresses using an address list.

9. The method of claim 5, wherein the combined request identifies the different addresses using an address range.

10. A non-transitory computer storage medium storing instructions which, when executed by a memory system, cause the memory system to perform a method, the method comprising:
running a plurality of processes in a controller in a solid-state drive of the memory system, wherein the processes communicate with each other using inter-process communication messages transmitted via a plurality of inter-process communication channels, in response to requests from a host system to store or retrieve data in a set of media;
identifying, by the solid-state drive of the memory system from the requests, a plurality of combinable requests among the requests from the host system, wherein the plurality of combinable requests are identified based on requesting a common set of operations to be operated upon non contiguous addresses in a logical memory address space;
generating a combined request; and
providing the combined request to the plurality of processes as a substitute of the plurality of combinable requests.

11. The non-transitory computer storage medium of claim 10, wherein the memory system receives from the host system the plurality of combinable requests in accordance with a predetermined protocol; a plurality of responses are communicated from the memory system to the host system in accordance with the predetermined protocol; and the predetermined protocol limits data items to be addressed by each request to a predetermined size limit.

* * * * *